(12) United States Patent
Behr et al.

(10) Patent No.: US 7,222,367 B2
(45) Date of Patent: May 22, 2007

(54) SYSTEM FOR COMPUTER-AIDED MONITORING OF THE USE OF LICENSES

(75) Inventors: Werner Behr, Paderborn (DE); Ralf Brese, Rietberg (DE); Rainer Zimmermann, Paderborn (DE); Bruno Bozionek, Borchen (DE); Achim Minderlein, Bad Lippspringe (DE)

(73) Assignee: Siemens Aktiengesellschaft, Munich (DE)

( * ) Notice: Subject to any disclaimer, the term of this patent is extended or adjusted under 35 U.S.C. 154(b) by 916 days.

(21) Appl. No.: 10/198,743

(22) Filed: Jul. 19, 2002

(65) Prior Publication Data

US 2003/0018899 A1    Jan. 23, 2003

(30) Foreign Application Priority Data

Jul. 20, 2001  (DE)  ................. 101 35 512

(51) Int. Cl.
G06F 21/00 (2006.01)
H04N 7/167 (2006.01)
(52) U.S. Cl. ........................................ 726/26; 380/201
(58) Field of Classification Search ...................... None
See application file for complete search history.

(56) References Cited

U.S. PATENT DOCUMENTS

| | | | |
|---|---|---|---|
| 5,742,757 A | 4/1998 | Hamadani et al. | |
| 5,940,504 A * | 8/1999 | Griswold | 705/59 |
| 6,023,766 A | 2/2000 | Yamamura | |
| 6,049,789 A * | 4/2000 | Frison et al. | 705/59 |
| 6,141,652 A | 10/2000 | Reeder | |
| 6,154,787 A | 11/2000 | Urevig et al. | |
| 6,901,386 B1 * | 5/2005 | Dedrick et al. | 705/59 |

FOREIGN PATENT DOCUMENTS

| | | |
|---|---|---|
| DE | 198 45 610 | 4/2000 |
| GB | 2 316 503 | 2/1998 |
| GB | 2 346 989 | 8/2000 |

* cited by examiner

*Primary Examiner*—Gilberto Barron, Jr.
*Assistant Examiner*—Kristin Sandoval
(74) *Attorney, Agent, or Firm*—Staas & Halsey LLP

(57) ABSTRACT

The use of licenses is monitored in a computer or communication system which has a plurality of terminals and in which at least one license is associated with at least one user. The use of the license or licenses by each user is recorded during a defined period after the license starts to run. Based on the recording result, a message is generated and sent to the user's terminal at least if the scope of use falls short of a predeterminable value.

17 Claims, 1 Drawing Sheet

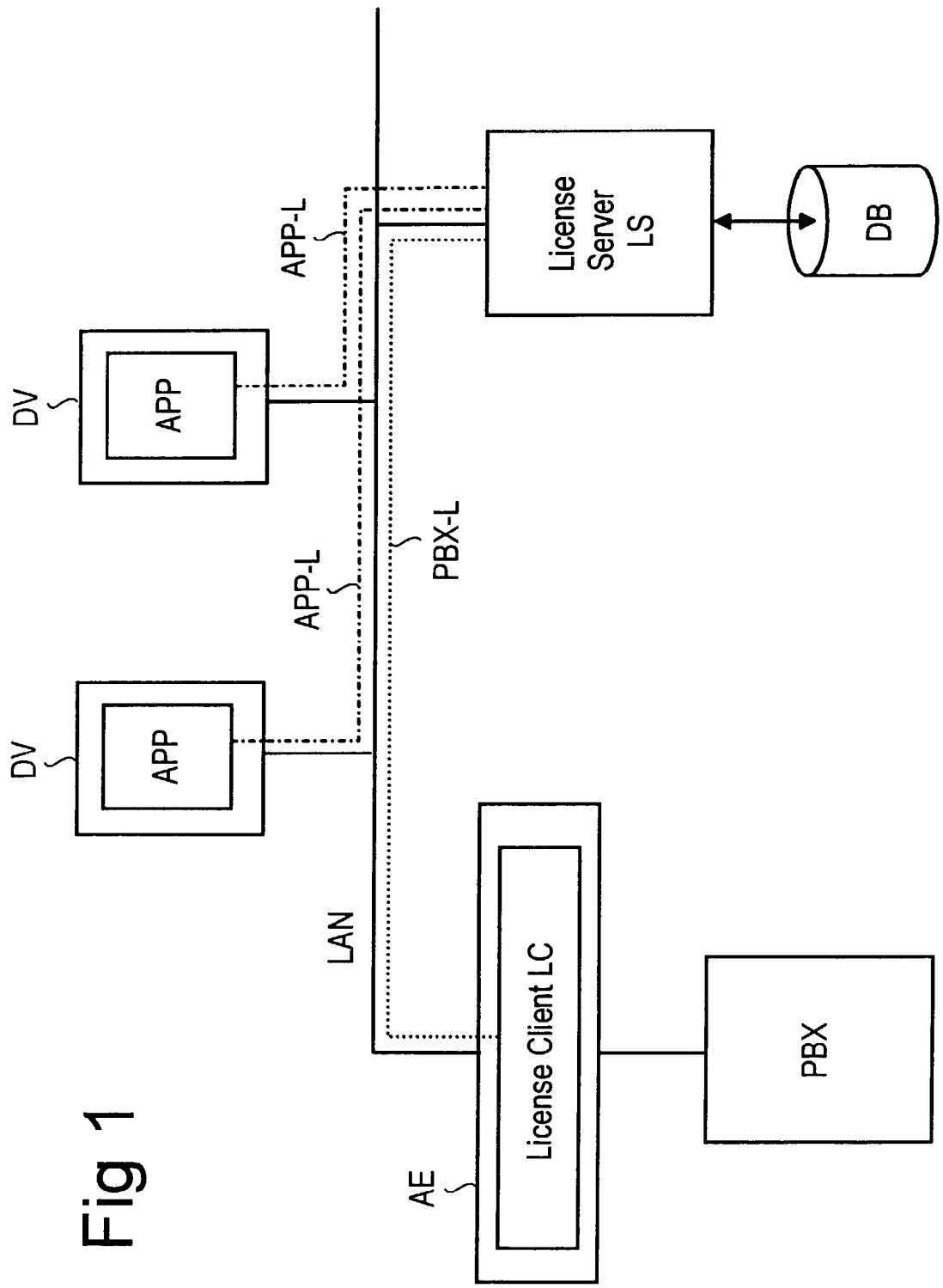

SYSTEM FOR COMPUTER-AIDED MONITORING OF THE USE OF LICENSES

CROSS REFERENCE TO RELATED APPLICATIONS

This application is based on and hereby claims priority to German Application No. 101 35 512.2 filed on Jul. 20, 2001, the contents of which are hereby incorporated by reference.

BACKGROUND OF THE INVENTION

The invention relates to monitoring the use of licenses and to evaluation and control of licenses.

Programs for electronic data processing installations or computer systems are normally licensed according to the number of users using the programs. A computer system requires as many program licenses as there are users using the program. This is referred to as user-related licensing which can be very cost-intensive. However, one or more of the cost-generating licenses often remains unused, since it is not always the case that all the users who wanted to or were supposed to use the program and who were therefore taken into account when purchasing the program license actually use the program.

One solution for better utilization of program licenses involves setting up "license pools". Particularly in larger computer systems, in particular in large computer networks, these are useful for limiting the number of program licenses required and hence for reducing costs. A license pool manages all available licenses such that, for example when a user calls a program, an administrator is asked for a free license in the pool. If a free license is available, it is assigned to the requesting user and is blocked for further use by third parties. However, such license pools, particularly the programs for managing the pools, are very complex in terms of the computer resources required and the maintenance involved. They are therefore generally suitable only for very expensive program licenses which need to be used to the full in the best way, and/or in large computer networks in relatively large companies in which there are sufficient computer resources available. In smaller computer systems, for example in the Small Office Home Office sector (SOHO sector), and for relatively simple programs, such as office packages, relatively small databases, graphics programs or the like, the complexity involved in this regard is generally too great.

A simpler solution is the automatic production of license statistics and periodic evaluation thereof by a system administrator. Such a license statistic can show, by way of example, which user uses his assigned licenses for various programs how often and for how long. The license statistic needs to be evaluated manually, however, which requires a relatively high level of work input. The evaluation can then be used to plan the redistribution, repurchasing and/or return of program licenses. The level of work input associated with this is also high, which means that this solution is also cost-intensive and is therefore of little suitability for smaller companies, in particular.

In addition, the known solutions are known only for managing licenses in computer systems. By contrast, solutions which allow simultaneous management of licenses in computer and communication systems are not known.

SUMMARY OF THE INVENTION

It is therefore an object of the present invention to propose a method and system for monitoring the use of licenses in computer and communication systems and a corresponding monitoring device which improve the utilization of available licenses with little involvement.

A fundamental concept of the invention is that the use of a license by a user to whom the license has been allocated is automatically monitored, and the result of monitoring is periodically signaled to the user. A license can be, by way of example, a license for a software program—subsequently referred to as a program license—or else a license for using resources in a communication system—subsequently referred to as a switch license. Within the context of the invention, a program is understood to mean any electronic data processing (EDP) program for a computer system, for example a word processing program, a spreadsheet, a database program, a CAD program. Accordingly, a program license is a license from the program manufacturer for using such a program. Correspondingly, a switch license is a license from a telecommunications provider for using a resource in a telecommunications system, for example telephone lines or transmission capacity. Normally, such a license is allocated to a company for a plurality of users or for implementation at a plurality of workstations.

A computer system used by a multiplicity of users generally contains user accounts. When user accounts and licenses associated therewith are referred to below, this means that a license has been allocated to a user, particularly to this user account, on an organizational basis. This corresponds to the user-related license model mentioned in the introduction, which is predominantly used for widespread standard programs (less so for special software).

The inventive method thus constantly records the actual use of the licenses associated with the individual user accounts in the system. In response to the respective recording results, it automatically sends messages to the terminals of the individual users if the users have not used their allocated licenses over a particular period or if a particular scope of use is not reached. This eliminates manual evaluation of a license statistic, since a license user is automatically informed about his use of the corresponding program or of the corresponding switch resource by the report to his terminal. In addition, the method can be implemented in an existing system easily and without any great involvement, that is to say inexpensively in particular.

The monitoring period can—depending on the specific license conditions—be set to hours, days, weeks or months, in particular approximately three months. Appropriate values are obtained from the use habits. If, by way of example, it is necessary to monitor the use of a program or of a switch resource for which there are only a few licenses available but which is used frequently, then a shorter period is appropriate than for a program which is used little or for a switch resource which is used little. In this context, a period of three months has been found to be particularly suitable for most programs and switch resources, in order to obtain the most revealing and informative use overview possible.

For differentiated ascertainment of the use of a license, the number of calls or the period of use of the licensed program or switch resource in the monitoring period is determined, for example. It is also possible to combine the two methods, so that use involves using both ascertainment of the calls to the corresponding program or to the corresponding switch resource and measurement of the periods of use. This results in very accurate determination of use, whereas using just one method is more inaccurate, but is associated with less involvement.

In one preferred embodiment of the method, the automatically generated message is sent to the user in the form of an electronic notification (e-mail). In the case of an e-mail, this naturally requires the user, more precisely his user account, to have an e-mail account, but this exists in virtually any modern computer system used by a plurality of users. Advantageously, e-mail systems or programs already existing on the computer system can be used. Another option is for the report to be displayed in a window on the user's screen or on a display for a telecommunications terminal, for example.

When the message has been sent, timing can also be started. Upon expiration of a prescribable response period, a license which is not used or is used too little is then withdrawn from the user and is released for other users. The response period is intended to be used to grant the user a kind of reflection and grace period. Following receipt of the report about use of his license, a user knows that he has not used the program or the switch resource over a relevant period or has used it too little—in accordance with the in-house use criteria—and must therefore expect use authorization to be withdrawn internally and assigned to another user. He can then check whether the licensed program or the licensed switch resource is needed for his work in the immediate future and can send a corresponding message (insistence upon use authorization or agreement to assignment thereof to another user) to the system's monitoring device.

An acknowledgement, particularly in the form of an e-mail, from the user account can stop the timing. This allows a user to give notice that he has been informed about the "low-level" use of his allocated license but wishes to continue to use the program or switch resource—or he can immediately release the use authorization.

Such an acknowledgement in response to the message automatically sent to the user terminal is preferably also evaluated automatically. Depending on the result of evaluation, a decision is made about withdrawal and subsequent release of the corresponding license. This is particularly useful if the acknowledgement can be used for various reactions by the user, that is to say he can express a desire to continue to use a license. Automatic signal evaluation can be effected on the basis of prescribed codes, for example. It is simplified, in particular, by a standardized acknowledgement which can be the report previously sent to the user account with prescribed, selectable options.

Preferably, withdrawal and subsequent release of an internal use authorization for the license can be followed by automatic sending of a release report to an administrator unit in the system, so that information about licenses which are freely available again is available centrally in the system. This information can be requested by all users who—for example in connection with the starting of a new project—need to use a particular licensed program or a switch resource.

This allows expensive licenses to be handled efficiently without engaging highly qualified (and highly paid) system administrator manpower. The use of already existing resources, such as an e-mail system for notifying the users about their use of licenses, makes the method particularly simple and inexpensive.

In one particularly advantageous embodiment, receipt of the release report is followed by automatic allocation of the released license to a user who is waiting for the license. In connection with this variant, it is also appropriate to perform the method such that the recording and notification procedure described above as a periodic procedure is started in response to a request by an interested user. In the case of this variant, receipt of a request for a licensed program or a switch resource by a previously unauthorized user involves the scope of use in a predetermined period in the past immediately being recorded for all the authorized users, and the procedure described above being used on the basis of the recording results. If it turns out that one of the previously authorized users has not made sufficient use of the licensed program or the licensed switch resource and, in particular, also does not assert further use, the authorization is assigned to the currently interested user.

The waiting user can be selected from a queue associated with the licensed program or the licensed switch resource. In this context, when a licensed program or a licensed switch resource is called, a user account is stored in the queue if the user has had no license assigned to date. Preferably, every licensed program and every licensed switch resource has an associated queue. The queues can be managed by a special program which runs as a system process in an operating system, for example. Advantageously, essentially all the users should have at least read access to the queue; write access to at least their own entries allows the users to remove the entries from the queue again if the license is no longer of interest to a user.

Finally, receipt of the release report can be followed by storage of the (internally) released license and allocation thereof to a user calling the program or the switch resource later.

The simultaneous monitoring of program licenses and switch licenses is implemented, in accordance with the invention, by a central unit which is arranged in a computer network and stores both information about the available program licenses and the available switch licenses. In this context, a program license is assigned to a user or to an application directly between the corresponding computer and the central unit. In the event of the user or the application accessing a switch resource, this is detected by a device linking the communication system to the computer network, and a corresponding request is transmitted to the central unit. A switch license is thus assigned to a user or to an application indirectly between the device linking the communication system to the computer network and the central unit.

An inventive evaluation and control device for licenses has a suitably adjustable timer (respectively associated with a user account), a monitor program for ascertaining the use of at least one license associated with a user account within a prescribable period associated with the user account, and a reporting program for generating and sending a report about the ascertained use to the user account.

The inventive evaluation and control unit for licenses is preferably implemented in the central unit.

The reporting program can be, by way of example, a plug-in for an e-mail system existing in the system. For the messages, a user interface is preferably used which prescribes for the notified user a simple, coded acknowledgement about his future need for his assigned program (for example, simple entry of the character "+" or of the digit "1" for continued need, or of the character "−" or of the digit "0" if there is no longer any need, into a prescribed response field in the original message). Alternatively, the reporting program can also be designed such that the messages are output on a display for a telecommunications terminal, with acknowledgement being effected by pressing an appropriate key on the telecommunications terminal.

In one preferred embodiment of the monitoring and assignment apparatus, the apparatus also has management functionality and, to this end, has a management program for managing and distributing licenses.

Preferably, the monitor program, the reporting program and/or the management program are an integral part of a program package for monitoring, releasing and assigning licenses which is designed for use with conventional computer operating systems, such as the operating systems of Microsoft's Windows family, operating systems of the company Apple Computers, UNIX or such widespread operating systems.

Such a program package can be provided on computer readable media, in particular independently of the manufacturers of the licensed programs or of the providers of the switch resources and of the operating system. However, it is then necessary to ensure that, for withdrawing and releasing licenses, there are suitable interfaces which the program package can access. These interfaces can be specified by the operating system. Preferably, they should be standardized. Otherwise, the program package needs to be appropriately prepared to process proprietary license interfaces. For this, a kind of module or plug-in for the program package could be provided for each program manufacturer, so that corresponding modules or plug-ins can be loaded (implemented) into the program package on the basis of the programs used in the system.

Other aspects and advantages of the invention are described below using a specific exemplary embodiment with reference to the FIGURE.

BRIEF DESCRIPTION OF THE DRAWING

These and other objects and advantages of the present invention will become more apparent and more readily appreciated from the following description of the preferred embodiments, taken in conjunction with the accompanying drawings of which:

FIG. 1 is a block diagram schematically illustrating the fundamental functional units of a system for managing licenses according to the present invention.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

In the exemplary embodiment, a communications installation PBX is connected to a local area network LAN via a line unit AE—generally implemented by a data processing device DV. In this case, data are transmitted between the communications installation PBX and the line unit AE on the basis of the CSTA standard, for example.

The local area network LAN has further data processing devices DV—for example PCs—and a central unit LS connected to it. The central unit LS—also called "license server"—manages the available program and switch licenses in the system. In addition, the central unit LS manages a multiplicity of application programs—subsequently called applications APP—which can be called and used using the data processing devices DV. Information about the licenses and the applications APP is stored in a database DB associated with the central unit LS in the present exemplary embodiment. Alternatively, the information and the applications APP can be stored directly in the central unit LS. For some programs and switch resources, the number of licenses available is smaller than the number of users.

In cases in which a user or an application APP accesses APP-L program licenses, a program license is assigned to the user or to the application APP directly between the corresponding data processing device DV and the central unit LS. When a user or an application APP accesses PBX-L a switch resource, this is detected by a "license client" LC implemented in the line unit AE, and the license client transmits a corresponding request to the central unit LS. A switch license is thus assigned to a user or to an application APP indirectly between the "license client" LC implemented in the line unit AE and the central unit LS.

The number of users does not necessarily have to be identical to the number of data processing devices DV in the local area network LAN. It can be smaller or else larger. Every user has an associated user account, specifically an account with a user-specific work environment (such as in the case of the operating systems UNIX, Windows NT and Windows 2000). This essentially means that a user can use any data processing device DV to log into the local area network LAN and will find his familiar work environment there.

Every user has a particular number of allocated licenses, that is to say, by way of example, the secretary in a firm has an allocated program license for word processing, a contact database and a spreadsheet. By contrast, a designer in the firm has an allocated program license relating to an (expensive) CAD program for design and for word processing.

In principle, the licenses are managed by an administrator in the local area network LAN. The administrator allocates, inter alia, licenses to users, more precisely their user accounts. To date, this administrator has also had the task of managing the licenses manually. The administrator also has a user account, which is also called an administrator account.

To simplify the administrator's work, and even to relieve him virtually completely of the burden of time-consuming management of the licenses, the central unit LS in the local area network LAN uses a program package—not shown—for monitoring, releasing and assigning licenses, the program package using the inventive method. The program-package comprises a plurality of program modules:

a monitor program for ascertaining the use of at least one license associated with at least one user account within a prescribable period which is associated with the at least one user account, a reporting program for generating and sending a report about the ascertained use to the at least one user account, and a management program for managing and distributing licenses.

It also manages suitable time-control devices for the monitoring operations, specifically timers which are associated with the individual user accounts and, by way of example, are started when a license is assigned to the respective user.

The monitoring operation for the use of a license which is associated with the user account will now be explained in more detail below:

The monitor program starts a routine which counts the number of calls to the program associated with the license or to the switch resource from the user account and measures and logs the respective use time. The ascertained data are stored and are automatically evaluated by the monitor program when the monitoring period has expired. To this end, the monitor program adds the use times in order to calculate the cumulative time for which the program or the switch resource is used by the user. In addition, the ascertained number of calls is included in the calculation, so that a single call with a long use time does not distort the result.

A check is then carried out to determine whether the ascertained use—more precisely the use time—is below a predeterminable value. By way of example, the value can stipulate an at least single use in the monitoring period for at least one hour. If the ascertained use falls short of this value, the reporting program calls a routine which automatically sends a pre-prepared e-mail containing the ascertained use to the user account. The sending of the e-mail simultaneously starts a timing routine.

The timing routine measures the time elapsing from when the e-mail is sent. When a particular time value is reached, for example a week from the e-mail having been sent, the reporting program signals to the management program that the license can be released. The management program then releases the license again by withdrawing the license from the user account. The user is thus first of all prevented from continuing to use the program or the switch resource. Following release, an e-mail is automatically sent to the administrator account so that the administrator is informed about the freely available license and, by way of example, can identify superfluous licenses, that is to say licenses which are used little or are not used at all.

However, should the user reply to the e-mail from the reporting program before the time value is reached by the timing routine, timing is automatically stopped. The user's response can then be evaluated automatically. Such evaluation is simplified by standardized e-mails in the form of a report by the reporting program and an acknowledgement by the user. By way of example, the e-mail to the user can be in the form of a form, so that the user merely needs to "cross" an option in the form by way of acknowledgement. In this context, it would be conceivable for the following options to be prescribed in the e-mail to the user account: a) further use of the program license wanted or b) no further use wanted.

In the individual case, the acknowledgement can also be automatic. To this end, the user merely uses a specially provided option permitting automatic acknowledgement in his e-mail program. This option can be implemented in conventional e-mail programs by a plug-in. The user can use this option, by way of example, to stipulate that any report about too little use is answered such that further use of the license by the user is assured. Such a case can arise, in particular, when the user is on holiday or, generally, does not use the program or the switch resource for a relatively long period. In this case, however, release of his allocated license would entail a considerable disadvantage for the user, which needs to be avoided.

Alternatively or in addition, the user can stipulate that, for particular licenses, the use information results in an automatic acknowledgement being given which causes release. By way of example, this can be used very advantageously for new programs or switch resources. In this case, the user can initially reserve a license in order to be able to test the new program or the new switch resource. Should he have no further interest in using it, he can use the aforementioned option to determine that the license needs to be released. In such an instance of application, the predeterminable threshold value for the scope of use should naturally be set to be very high in order to ensure that an automatic report is sent when the monitoring period has expired. This is because it can be assumed that the new program or the new switch resource will be used intensively during the first monitoring period, and no report would normally be generated.

Finally, it will be mentioned that expiration of a monitoring period can be followed by further monitoring periods either "seamlessly" or at a certain time interval, preferably determined by the prescribable time value. Preferably, a new monitoring period starts when no report has been sent (since the use of a program license by a user is sufficient) or the user wishes to continue to keep a license despite low-level use.

Monitoring, report generation and management of licenses are preferably performed continually in the background, for example as an "invisible" operating system process, in the local area network LAN. This makes it possible to achieve inexpensive management and control of the distribution of licenses.

The invention has been described in detail with particular reference to preferred embodiments thereof and examples, but it will be understood that variations and modifications can be effected within the spirit and scope of the invention.

What is claimed is:

1. A computer-aided method for monitoring use of at least one license in at least one of a computer and a communication system having a plurality of terminals and in which at least one license is associated with at least one user, the use of the at least one license by each user being recorded during a defined period after the license starts to run, said method comprising:
sending a message generated based on a recording result to a user terminal if the user has not used the license in the defined period.

2. The method as claimed in claim 1, wherein the defined period includes multiple months.

3. The method as claimed in claim 1, wherein the defined period is one of three, six and twelve months.

4. The method as claimed in claim 1, wherein said sending sends the message to the user terminal via e-mail.

5. The method as claimed in claim 1, further comprising:
timing a response period starting with said sending of the message; and
withdrawing the at least one license from the user internally and releasing the at least one license for other users when the response period reaches a predetermined expiration time.

6. The method as claimed in claim 5, further comprising stopping said timing of the response period upon receipt of an acknowledgement e-mail message from the user terminal.

7. The method as claimed in claim 6, wherein said sending of the message to the user includes sending user-guidance advice indicating a formalized acknowledgement which permits automatic evaluation of the acknowledgement.

8. The method as claimed in claim 1, wherein said sending of the message to the user includes sending user-guidance advice indicating a formalized acknowledgement which permits automatic evaluation of the acknowledgement, and
wherein said method further comprises automatically deciding whether to internally withdraw the at least one license from the user and release the at least one license for other users.

9. The method as claimed in claim 8, further comprising automatically sending a release report to an administration device in the system after internal withdrawal and subsequent release of the at least one license.

10. The method as claimed in claim 9, further comprising automatically assigning the at least one license identified in the release report, to a user who has used a terminal to send a requirement message to the administration device, after receipt of the release report by the administration device.

11. The method as claimed in claim 10, further comprising recording use of the license in the administration device in response to arrival of a requirement message from a previously unauthorized user.

12. The method as claimed in claim 11, further comprising storing a release identifier for the released license centrally in the system, and wherein said automatically assigning the at least one license includes allocating the at least one license for which the release identifier has been stored to the terminal of the user, when the user had not previously been allocated the license.

13. The method as claimed in claim 12, further comprising:

permanently monitoring a plurality of licenses in parallel; and providing for allocation and reallocation of the licenses.

14. The method as claimed in claim 13, wherein the license is at least one of a program license and a switch license.

15. A computer readable medium storing at least one program embodying a method for monitoring use of at least one license in at least one of a computer and a communication system having a plurality of terminals and in which at least one license is associated with at least one user, the use of the at least one license by each user being recorded during a defined period after the license starts to run, said method comprising:

sending a message generated based on a recording result to a user terminal if the user has not used the license in the defined period.

16. The computer readable medium as claimed claim 15, wherein said method further comprises monitoring use of the license in a program, designed for use with a standard operating system, which also performs said sending of the message.

17. The computer readable medium as claimed claim 16, wherein said method further comprises managing the licenses in the program which also performs said sending and monitoring.

* * * * *